US010433129B2

(12) United States Patent
Gupta et al.

(10) Patent No.: US 10,433,129 B2
(45) Date of Patent: Oct. 1, 2019

(54) ENHANCED DATA DOWNLOAD MECHANISM FOR POWER CONSTRAINED INTERNET OF THINGS DEVICES

(71) Applicant: AT&T Intellectual Property I, L.P., Atlanta, GA (US)

(72) Inventors: Gaurav Gupta, Sammamish, WA (US); Rajendra Prasad Kodaypak, Sammamish, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 239 days.

(21) Appl. No.: 15/340,089

(22) Filed: Nov. 1, 2016

(65) Prior Publication Data
US 2018/0124544 A1    May 3, 2018

(51) Int. Cl.
*H04W 4/50* (2018.01)
*H04W 4/18* (2009.01)
*H04L 29/08* (2006.01)
*H04L 12/24* (2006.01)
*H04W 52/02* (2009.01)

(52) U.S. Cl.
CPC ............ *H04W 4/50* (2018.02); *H04L 41/082* (2013.01); *H04L 67/06* (2013.01); *H04L 67/34* (2013.01); *H04W 4/18* (2013.01); *H04L 67/125* (2013.01); *H04W 52/0222* (2013.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/21* (2018.01); *Y02D 70/24* (2018.01)

(58) Field of Classification Search
CPC ... H04W 4/50; H04W 4/001; H04W 52/0222; H04L 41/082; H04L 67/06; H04L 67/34; H04L 67/125
See application file for complete search history.

(56) References Cited

U.S. PATENT DOCUMENTS

| 9,094,481 B2 | 7/2015 | Srinivasan et al. |
| 9,148,746 B2 | 9/2015 | Raouf et al. |
| 2007/0038681 A1* | 2/2007 | Pierce ................. G06F 11/1464 |
| 2014/0040421 A1* | 2/2014 | Baldwin ................. H04L 45/24 709/217 |

(Continued)

*Primary Examiner* — Brian J. Gillis
*Assistant Examiner* — Chhian (Amy) Ling
(74) *Attorney, Agent, or Firm* — Hartman & Citrin LLC

(57) ABSTRACT

Concepts and technologies disclosed herein are directed to an enhanced data download mechanism for power constrained Internet of Things ("IoT") devices. An IoT file share server can receive an update file from an IoT application server. The IoT file share server can calculate a file chunk size based upon a device type of the IoT device and a file size of the update file. The file chunk size can be calculated such that each file chunk of a plurality of file chunks is downloadable to the IoT device in a single awake period of the IoT device. The IoT file share server can partition the update file into a plurality of file chunks to be sent to the IoT device, each of which can include a portion of the update file, and the portion can be of the file chunk size.

20 Claims, 10 Drawing Sheets

(56) References Cited

U.S. PATENT DOCUMENTS

| | | |
|---|---|---|
| 2014/0065964 A1* | 3/2014 | Turunen ............... H04W 8/005 |
| | | 455/41.2 |
| 2014/0126441 A1 | 5/2014 | Rai et al. |
| 2015/0117285 A1 | 4/2015 | Xie et al. |
| 2015/0271247 A1* | 9/2015 | Patsiokas ............... H04W 4/70 |
| | | 709/217 |
| 2015/0365891 A1 | 12/2015 | Marcks Von Wurtemberg |
| 2016/0021639 A1 | 1/2016 | Ma et al. |
| 2016/0100362 A1 | 4/2016 | Palanisamy et al. |
| 2016/0128078 A1 | 5/2016 | Murthy et al. |
| 2016/0205625 A1 | 7/2016 | Stojanovski et al. |
| 2018/0314314 A1* | 11/2018 | Link, II ............... G06F 1/3246 |

* cited by examiner

ENHANCED DATA DOWNLOAD MECHANISM FOR POWER CONSTRAINED INTERNET OF THINGS DEVICES

BACKGROUND

As the Internet of Things ("IoT") continues to gain widespread market momentum in the industry, the promise of modern mobile connectivity and automation in a connected world of humans and machines will be made possible through the introduction of low cost IoT technology coupled with advances in software-defined networking. As such, network and radio design for the IoT likely will be a key driver for 5G mobile telecommunications technologies.

Fundamental to the development of IoT networks and a services model that leverages next generation mobile telecommunication technologies, such as Long-Term Evolution ("LTE") and LTE-Advanced, is the end device that consists of building blocks, including a multi-mode wireless transceiver and application processors with integrated software intelligence to interwork with the existing and evolving mobility network infrastructure. To successfully design an IoT type product that enables mobile connectivity solution with extended battery life of 10+ years and works across multiple industry segments, designers need to build small form factor modules with the cheapest bill of materials that can operate reliably over several years without battery replacement.

While Third Generation Partnership Project ("3GPP") standards in Releases 12 and 13 propose several feature enhancements such as Power Savings Mode ("PSM"), Extended Discontinuous Reception ("eDRX"), and Enhanced Coverage ("EC") that span across various network functions to enhance the power savings, reachability, and battery life of such devices, these features alone are not adequate to fully realize the potential of network and IoT service provider's needs.

In addition, the non-IP data delivery model proposed by 3GPP for infrequent and small data communication via the control plane fails to address the end device upgrade strategy by not impacting battery life. Such low cost devices might need to be upgraded frequently with variable binaries (images) for potential firmware/software changes in response to the standards evolution and service dynamics adopted by the IoT service providers.

SUMMARY

Concepts and technologies disclosed herein are directed to an enhanced data download mechanism for power constrained IoT devices. According to one aspect of the concepts and technologies disclosed herein, an IoT file share server can receive an update file from an IoT application server. The update file can include an update for an IoT device. The update can include a software update for software to be executed by the IoT device. The update can include a firmware update for firmware of the IoT device. The update can alternatively include a combination of a software update and a firmware update. In some embodiments, the update file is accompanied by a device identity that uniquely identifies the IoT device. The IoT file share server can calculate a file chunk size based upon a device type of the IoT device and a file size of the update file. The device type can be determined based upon the device identity. The file chunk size can be calculated such that each file chunk of a plurality of file chunks is downloadable to the IoT device in single awake period of the IoT device. In this manner, the IoT device can save battery life over prior art solutions. In some embodiments, the size of each file chunk is dependent upon the bandwidth available to the IoT device based upon the device category of that device and the expected downlink throughput based upon the wireless technology. The device category can be determined based upon the device identity. The IoT file share server can partition the update file into a plurality of file chunks, each of which can include a portion of the update file, and the portion can be of the file chunk size.

The IoT file share server also can determine whether the IoT device has transitioned to an awake period. When the IoT device has transitioned to an awake period, the IoT file share server can receive an awake notification. The awake notification can include the device identity that uniquely identifies the IoT device so that the IoT file share server can locate the appropriate update file. In some embodiments, the awake notification originates from a service capability exposure function ("SCEF"). In some embodiments, the awake notification originates from a packet gateway node.

The IoT file share server also can send a file chunk of the plurality of file chunks to the IoT device. The IoT file share server can then move a pointer to a next file chunk of the plurality of file chunks so that the IoT file share server knows which file chunk of the plurality of file chunks to send next to the IoT device. The IoT file share server also can determine whether the IoT device has downloaded the plurality of file chunks. When the device has downloaded the plurality of file chunks, the IoT file share server can designate the update for the IoT device as downloaded.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
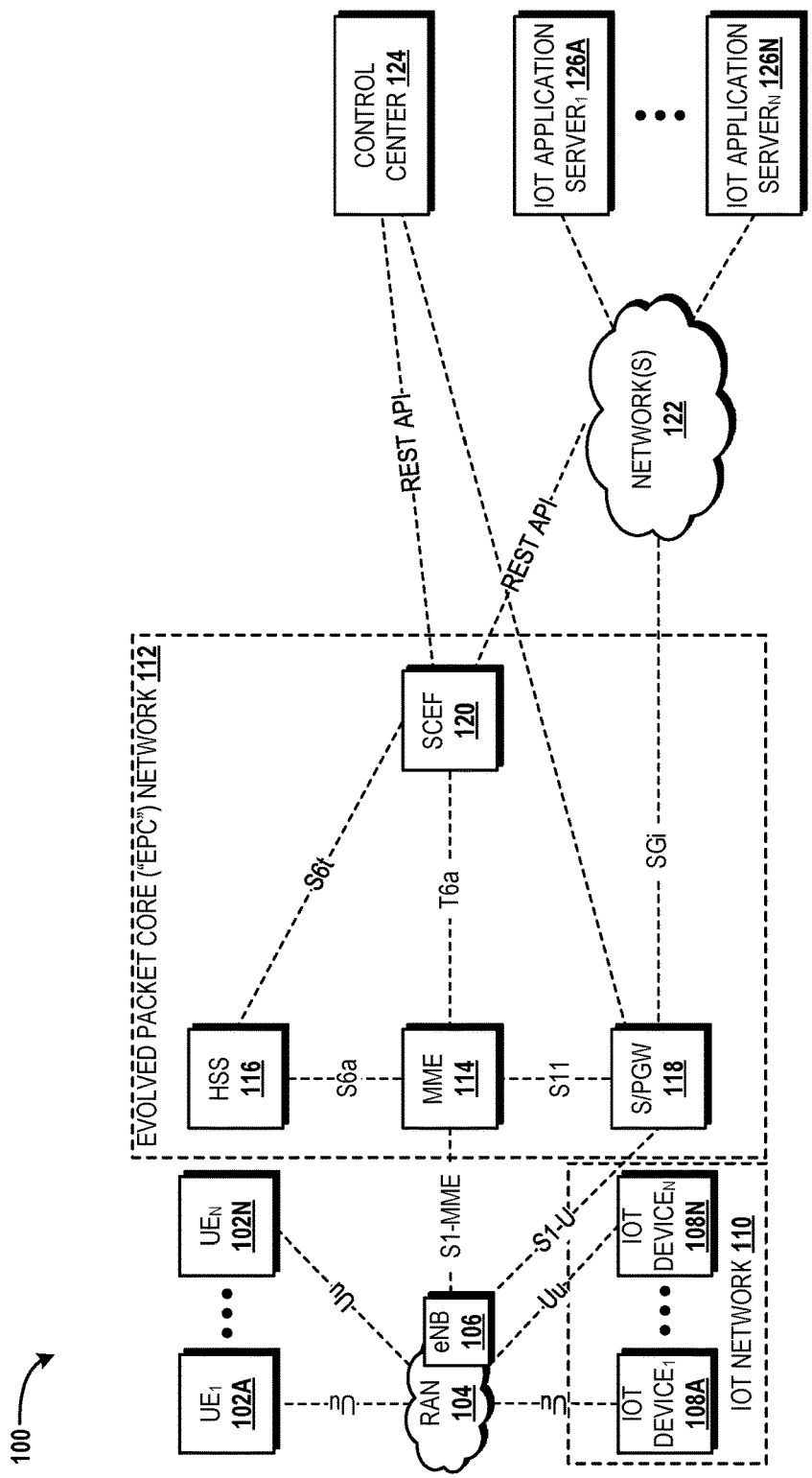
FIG. 1 is a block diagram illustrating aspects of a prior art operating environment suitable to implement a prior art approach to IoT firmware/software over-the-air updates.

The concepts and technologies disclosed herein are directed to an enhanced data download mechanism for power constrained IoT devices. In particular, an intelligent network-based firmware/software update mechanism for IoT devices is disclosed that can successfully complete targeted upgrades in a non-intrusive manner and still deliver innovative IoT services with IoT's continued promise of long-term battery life.

In order to address the demands of mobile IoT communications, a variety of low power wide area networking ("LPWA") technologies are being considered by global carriers and IoT service providers. Several of these new technologies are non-3GPP standards based and operate in unlicensed frequency bands, and for this reason, are faced with a variety of technological challenges, including interference, coverage, scale, and reliability. 3GPP standards-based LPWA technologies offer software-defined solutions with the introduction of new device category types such as CAT1/CATM1/Narrow Band-IoT ("NB-IoT"), and the like. These devices operate in different radio channel bandwidths that are sub-multiples of the standard spectrum deployed for LTE services today. By deploying such 3GPP standards-based solutions, carriers can leverage existing network infrastructure and realize economies of scale in launching new IoT services with software-defined capabilities in their existing access and core network functions as well as with the introduction of certain key core network functions. Standards defined IP and Non-IP data delivery models could be utilized for IoT communications. For example, CATM1 devices that operate in a 1.4 MHz channel could leverage control plane/user plane methods based on their applications and/or service requirements that require higher data throughput and lower latency. NB IoT devices that operate in a 200 kHz channel could leverage Non-IP data delivery as it could be more efficient, compared to traditional IP-based solutions, for infrequent short data communications while preserving device battery life. A large volume of these IoT devices may need to be upgraded frequently with their firmware/software binaries due to the introduction of new standards-based features as well as innovative application layer enhancements that could be pushed into such devices (e.g., generation of targeted analytics for reporting) by the service providers working with carriers. While these binaries could be variable in size depending on the upgrade, these binaries may not be downloadable in a single instance as that could deteriorate the battery life expected from such low cost IoT devices. To circumvent this situation in the IoT device base, and to preserve in-field critical battery life, the concepts and technologies disclosed herein provide a network-based data chunk download, upgrade, and reporting mechanism for the IoT devices.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for enhanced data download mechanism for power constrained IoT devices will be described.

Referring now to FIG. 1, an illustrative prior art operating environment 100 suitable to implement a prior art approach to IoT firmware/software over-the-air updates. The prior art operating environment 100 includes a plurality of user equipment devices ("UEs") 102A-102N (referred to herein collectively as UEs 102, or generally in the singular form as UE 102) operating in communication with a radio access network ("RAN") 104. The UEs 102 can communicate with the RAN 104 by way of one or more eNodeBs ("eNBs") 106. The operating environment 100 also includes a plurality of IoT devices 108A-108N (referred to herein collectively as IoT devices 108, or generally in the singular form as IoT device 108) also operating in communication with the RAN 104 by way of one or more eNBs 106. In some implementations, an IoT device 108 can connect to a home eNB (not shown) for access to the RAN 104. In these implementations, the home eNB can route traffic to/from the IoT device(s) 108 through the RAN 104 via an IoT gateway (also not shown). Although only a single eNB 106 is shown, the RAN 104 can support multiple eNBs configured the same as or similar to the eNB 106.

Each of the UEs 102 can be a cellular phone, a feature phone, a smartphone, a mobile computing device, a tablet computing device, a portable television, a portable video game console, or the like capable of communicating with the RAN 104. The RAN 104 can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a multi-standard metro cell ("MSMC") cell-type, and a white space network cell-type. For ease of explanation, a "small cell" cell-type is utilized herein to collectively refer to a group of cell-types that includes femto cell-type (e.g., home eNB), pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated wireless wide area network ("WWAN") WI-FI and cellular technologies, and as such, the UEs 102 can be dual-mode devices.

The IoT devices 108, in some embodiments, form, at least in part, an IoT network 110. The IoT is a concept of making physical objects, collectively "things," also referred to herein as the IoT devices 108, network addressable to facilitate interconnectivity for the exchange of data. The illustrated IoT network 110 can include any number of "things," including the IoT devices 108, for example. The IoT devices 108 can be or can include any "thing" that can collect data and that is configured to be network addressable so as to connect to and communicate with one or more networks, such as the RAN 104, over which to communicate the data to other connected devices, including, for example, computers, smartphones, tablets, vehicles, other IoT devices, combinations thereof, and the like. The IoT devices 108 can be deployed for consumer use and/or business use, and can find application in many industry-specific use cases. For example, the IoT devices 108 may find at least partial application in the following industries: automotive, energy, healthcare, industrial, retail, and smart buildings/homes. Those skilled in the art will appreciate the applicability of IoT-solutions in other industries as well as consumer and business use cases. For this reason, the applications of the IoT devices 108 described herein are used merely to illustrate some examples and therefore should not be construed as being limiting in any way. Although in the illustrated example the IoT devices 108 are shown as being in communication with one RAN (i.e., the RAN 104), the IoT devices 108 may be in communication with any number of access networks, including networks that incorporate collocated WWAN WI-FI and cellular technologies, and as such, one or more of the IoT devices 108 can be dual-mode devices.

The UEs 102 and the IoT devices 108 can each be associated with an identity (also referred to herein as device identification or device identity). The identity can include, for example, International Mobile Subscriber Identity ("IMSI"), a Mobile Station International Subscriber Directory Number ("MSISDN"), an International Mobile Equipment Identity ("IMEI"), or a combination of an IMSI and an IMEI. The device identification information, in some embodiments, can additionally include a device category that specifies a category to which the device belongs. The device identification information can identify the device as being either a device for a standard mobile telecommunications services such a voice and/or data. The device identification information can alternatively identify the device as an IoT or other non-IoT mobile device. In some embodiments, the IoT devices 108 can be category 1 ("CAT1"), CAT0, CATM1, NB IoT based machine-type communication devices, or some combination thereof.

The RAN 104 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes a virtual RAN ("vRAN").

As used herein, a "base station" refers to a radio receiver and/or transmitter (collectively, transceiver) that is/are configured to provide a radio/air interface (a Uu interface in the illustrated example) over which the UEs 102 and the IoT devices 108, can connect to an evolved packet core ("EPC") network 112. Accordingly, a base station is intended to encompass one or more base transceiver stations ("BTSs"), one or more NBs, one or more eNBs (e.g., the eNB 106), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102 and the IoT devices 108.

The EPC network 112 can include one or more mobility management entities ("MME") 114, one or more home subscriber servers ("HSS") 116, one or more serving gateways ("SGW") and one or more packet data network gateways ("PGWs") (illustrated as a combined S/PGW 118, and one or more service capability exposure functions ("SCEF") 120. Although not shown in the illustrated example, the EPC network 112 can additionally include other network elements.

The core network components of the EPC network 112 can be implemented as physical network functions ("PNFs") having hardware and software components. The core network components of the EPC network 112 can additionally or alternatively be provided, at least in part, by virtual network functions ("VNFs"). For example, the core network components can be realized as VNFs that utilize a unified commercial-of-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function. For example, the MME 114, the HSS 116, the S/PGW 118, the SCEF 120, or any combination thereof can be implemented as stand-alone VNFs or as a VNF operating in a VNF pool. An example infrastructure that can embody any combination of the aforementioned PNFs as VNFs will be described herein below with reference to FIG. 9.

The MME 114 can be configured in accordance with 3GPP standards specifications. The MME 114, in general, can perform operations to control signaling traffic related to mobility and security for access to the RANs 104 via an S1-MME interface. The MME 114 is also illustrated as being in communication with the HSS 116 via an S6a interface, the S/PGW 118 via an S11 interface, and the SCEF 120 via a T6a interface. These interfaces are defined as part of 3GPP standards specifications.

The HSS 116 can be configured in accordance with 3GPP standards specifications. The HSS 116 is a database that contains user-related information for users of devices, such as the UEs 102 and the IoT devices 108. The HSS 116 can provide support functions to the MME 114 for mobility management, call and data session setup, user authentication, and access authorization. The HSS 116 is also illustrated as being in communication with the SCEF 120 via an S6t interface and the MME 114 via an S6a interface. These interfaces are defined as part of 3GPP standards specifications.

The SGW and the PGW of the combined S/PGW 118 can be configured in accordance with 3GPP standards specifications. The SGW provides a point of interconnect between the radio-side (e.g., the RAN 104) and the EPC network 112. The SGW can serve devices by routing incoming and outgoing IP packets between the RAN 104 and the EPC network 112. The PGW interconnects the EPC network 112 to one or more other networks, such as one or more other public land mobile networks ("PLMNs"), one or more packet data networks ("PDNs") (e.g., the Internet), combinations thereof, and/or the like—generally shown as network(s) 122. The PGW routes IP packets to and from the network(s) 122. The PGW also perform operations such as IP address/prefix allocation, policy control, and charging. The S/PGW 118 is illustrated as being in communication with the MME 114 via an S11 interface and the network(s) 122 via an SGi interface. These interfaces are defined as part of 3GPP standards specifications.

The SCEF 120 can be configured in accordance with 3GPP standards specifications. The SCEF 120 provides functionality to securely expose the services and capabilities provided by the EPC network 112 to other entities, including, in the illustrated example, a control center 124 and the network(s) 122, which provide access to one or more IoT application servers 126A-126N (referred to herein collectively as the IoT application servers 126, or generally in the singular form as IoT application server 126). The SCEF 120 can expose the services and capabilities provided by the EPC network 112 via one or more representational state transfer ("REST") application programming interfaces ("APIs").

The control center 124 provides a central entity to provision, manage, and monitor the IoT devices 108. The control center 124 interacts with the EPC network 112 via REST APIs through the SCEF 120. Other control centers and implementations thereof are contemplated.

The IoT application servers 126 can serve IoT-based application programs for use by the IoT devices 108. At least one of the IoT application servers 126 can provide an IoT firmware and/or software over-the-air update mechanism through which the IoT devices 108 can be upgraded. According to various implementations, the functionality of the IoT application servers 126 can be provided by one or more server computers that are executing as part of, or in communication with, the network(s) 122. The IoT application servers 126 can host various services, virtual machines, portals, and/or other resources associated with IoT.

Figure 2:
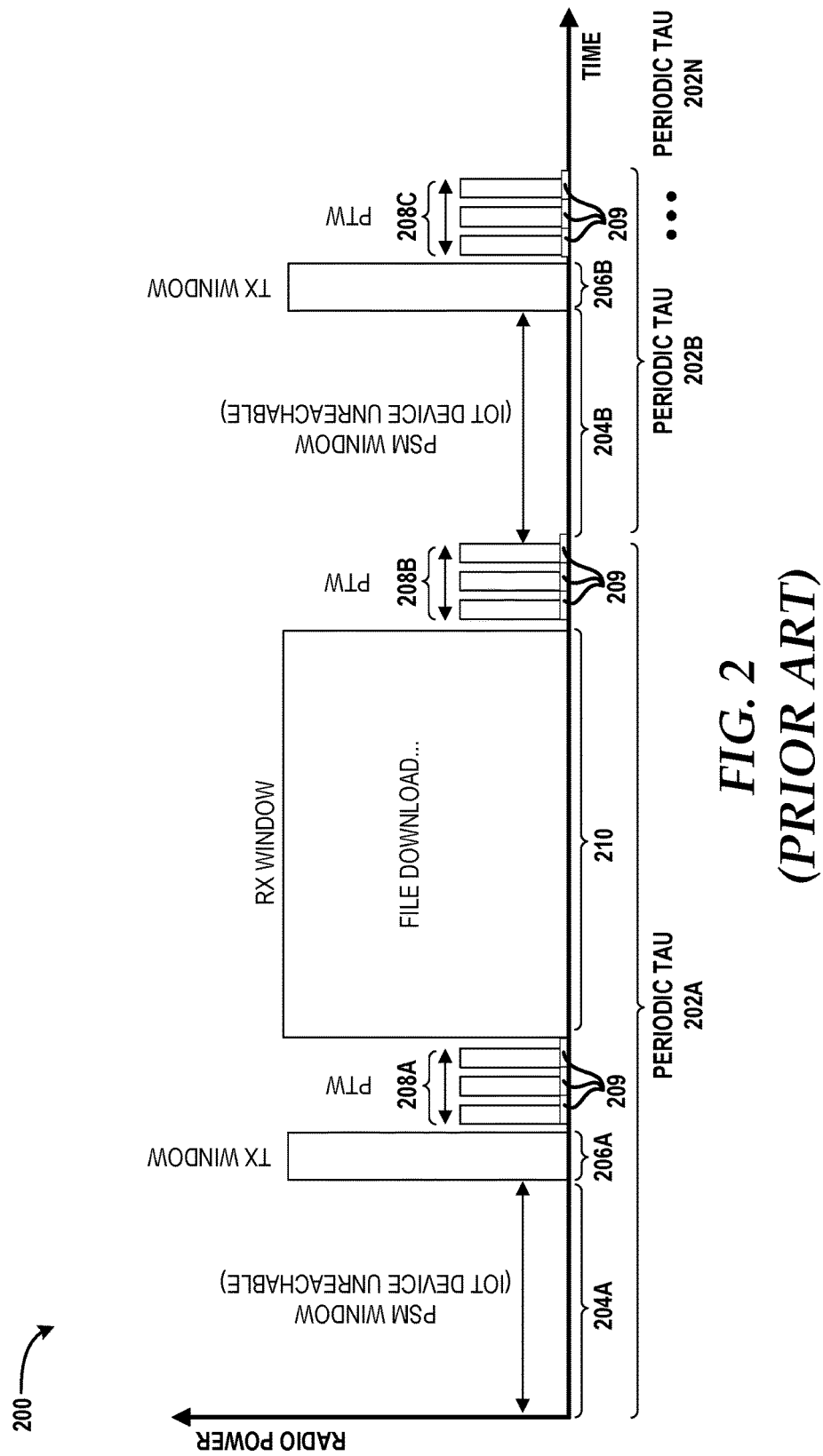
FIG. 2 is a graphical representation of a power profile associated with operations of an IoT device during an over-the-air IoT firmware/software update process in accordance with existing technologies.

Turning now to FIG. 2, a graphical representation of a power profile 200 associated with operations of the IoT device 108 during an over-the-air IoT firmware/software update process in accordance with existing technologies will be described. In the example shown, the power profile 200 is represented graphically with the X-axis representing time and the Y-axis representing the radio power level of the IoT device 108. The power profile 200 includes periodic tracing area update cycles ("periodic TAU") 202A, 202B . . . 202N. Periodic TAU is used to periodically notify the availability of a device, such as the IoT device 108, to the network. This procedure is controlled in the IoT device 108 by the periodic TAU timer (known as timer T3412). The value of timer T3412 is sent by the network to the IoT device 108 in the ATTACH ACCEPT message and can be sent in the TAU ACCEPT message. The IoT device 108 shall apply this value in all tracking areas of the list of tracking areas assigned to the IoT device 108, until a new value is received.

During a first cycle 202A, the IoT device 108 enters a first power saving mode ("PSM") window 204A during which the IoT device 108 is dormant and unreachable, and the power drawn by the IoT device 108 is extremely low, thereby conserving battery life. After the first PSM window 204A, the IoT device 108 enters a first transmit window ("TX window") 206A during which the IoT device 108 can transmit data. For example, the IoT device 108, embodied as an energy meter, can be configured to perform an energy reading (e.g., in kilowatt hours) and transmit a result of that energy reading to one of the application servers 126 during the first TX window 206A.

After the first TX window 206A, the IoT device 108 enters a first paging time window ("PTW") 208A during which the IoT device 108 is reachable. The first PTW 208A includes a plurality of DRX cycles 209 that each include a time period during which the IoT device 108 is reachable (i.e., can be paged) followed by another time period during which the IoT device 108 is unreachable (i.e., cannot be paged). The DRX cycles 209 facilitate battery life savings for the IoT device 108. Although only the DRX cycles 209 are shown in the illustrated example, those skilled in the art will appreciate the use of eDRX cycles (not shown) to further enhance batter life saving for the IoT device 108.

In the illustrated example, the IoT device 108 is contacted by the IoT application server 126 during the first PTW 208A to notify the IoT device 108 that a firmware/software file is available for download. In response, the IoT device 108 enters a receive window ("RX window") 210 during which the IoT device 108 receives, from the IoT application server 126, a firmware/software file in its entirety. In other words, the RX window 210 is a time window with an amount of time sufficient to download the entirety of the firmware/software file without interruption. During the RX window 210, the power drawn by the IoT device 108 is relatively high, thereby reducing battery life. The IoT device 108 then enters a second PTW 208B during which the IoT device 108 is once again reachable prior to the IoT device 108 entering a second periodic TAU cycle 202.

During the second periodic TAU cycle 202B, the IoT device 108 enters a second PSM window 204B during which the IoT device 108 is once again dormant and unreachable, and the power drawn by the IoT device 108 is extremely low, thereby conserving battery life. After the second PSM window 204B, the IoT device 108 enters a second TX window 204B during which the IoT device 108 transmits data. After the second TX window 204A, the IoT device 108 enters a third PTW 208C during which the IoT device 108 is once again reachable prior to the IoT device 108 entering another periodic TAU cycle 202N, and another PSM window (not shown).

While 3GPP standards in Releases 12 and 13 have proposed feature enhancements such as PSM, eDRX, and enhanced coverage ("EC") that span across various network functions to enhance power savings, reachability, and battery life of devices such as the IoT devices 108, these features alone are not adequate to fully realize the potential of next generation networks to meet the needs of IoT service providers. In addition, the non-IP data delivery model proposed by 3GPP for infrequent and small data communications via the control plane fails to address the update strategy for devices that might require frequent update through variable binaries (images) for firmware/software changes in response to standards evolution and service dynamics adopted by the IoT service providers. The concepts and technologies disclosed herein provide an intelligent network-based firmware/software update mechanism for the IoT devices 108. This mechanism allows such updates to be completed successfully in a non-intrusive manner and still deliver the innovative IoT services with long-term battery life (e.g., 10+ years).

Figure 3:
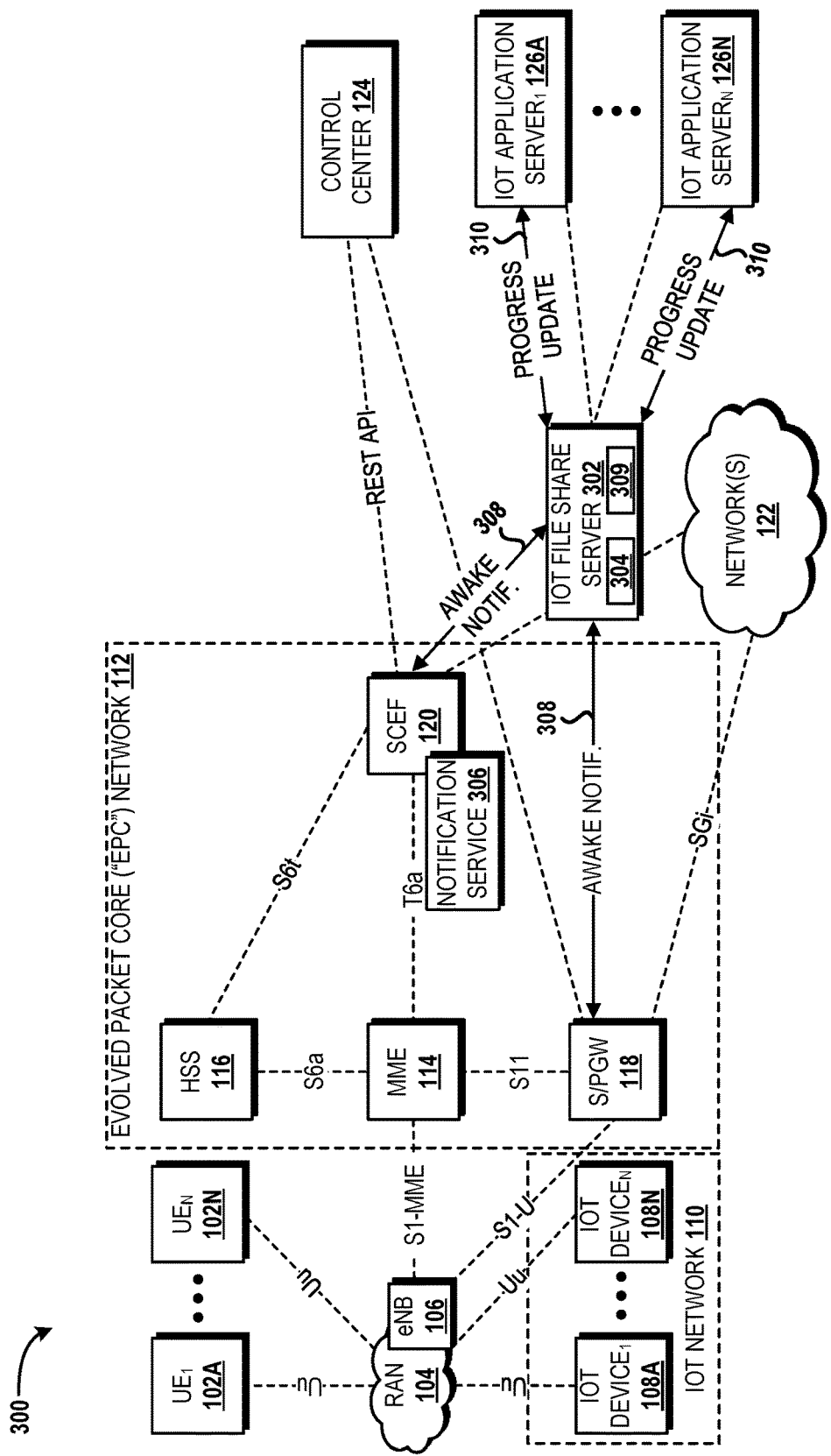
FIG. 3 is a block diagram illustrating aspects of an illustrative operating environment suitable to implement embodiments of the concepts and technologies described herein.

Turning now to FIG. 3, an illustrative operating environment 300 suitable to implement embodiments of the concepts and technologies described herein. The operating environment 300 includes the UEs 102, the RAN 104, the eNB 106, the IoT devices 108, the IoT network 110, the EPC network 112, the MME 114, the HSS 116, the S/PGW 118, the SCEF 120, the network(s) 122, the control center 124, and the IoT application servers 126 introduced above in the prior art operating environment 100. The operating environment 300 illustrated in FIG. 3 additionally includes an IoT file share server 302 that enables, at least in part, the intelligent network-based firmware/software update mechanism for the IoT device 108 in accordance with the concepts and technologies disclosed herein.

The IoT file share server 302 is illustrated as being in communication with the IoT application server(s) 126, the SCEF 120, the network(s) 122, and the S/PGW 118. The IoT file share server 302 can store a copy of any update files 304 that are to be sent to one or more of the IoT devices 108, which can include individual IoT devices 108 or one or more classes of IoT devices 108. The IoT file share server 302 can partition the update files 304 into a plurality of chunks (best shown in FIG. 4) such that each chunk can be downloaded to the IoT device(s) 108 in a single awake period of the IoT device(s) 108 and, in this manner, saving battery life over the prior art solutions described herein above. In some embodiments, the size of each file chunk is dependent, at least in part, upon the bandwidth available to the target IoT device based upon the device category of that device. In some embodiments, the size of each file chunk is dependent, at least in part, upon the radio access technology ("RAT") or multiple RATs that the IoT device 108 is capable of utilizing, and the technical specifications associated therewith (e.g., frequency, bandwidth, throughput, etc.). Accordingly, the IoT file share server 302 can partition each of the update files 304 multiple times so that there can be different sizes of file chunks for the same file to accommodate different device types and capabilities.

The IoT file share server 302 can subscribe via the SCEF 120 to a notification service 306. The notification service 306 can provide one or more awake notifications 308 to the IoT file share server 302 responsive to one or more of the IoT devices 108 being in an awake state. The awake notification(s) 308 can be sent to the IoT file share server 302 by way of the S/PGW 118 and/or the SCEF 120.

In some embodiments, the IoT file share server 302 can subscribe to all of the IoT devices 108 served by the EPC 112. In other embodiments, the IoT file share server 302 can subscribe to one or more of the IoT devices 108 that belong to a specific IoT device category. In some other embodiments, the IoT file share server 302 can subscribe to a specific set of IoT devices 108 identified by a specified range of identifiers, such as, for example, IMEIs. The IoT file share server 302 can subscribe to all of the IoT devices 108 or can selectively subscribe to the IoT devices 108 that have been flagged as being in need of an update reflected in one or more of the update files 304.

For each of the IoT devices 108 for which the IoT file share server 302 has one or more of the update files 304 available, the IoT file share server 302 can store a reference 309 to the file chunk that was last downloaded by each of the IoT devices 108 such that in the next awake period for the associated IoT device 108 will be scheduled to receive the subsequent file chunk. If no file chunks have been downloaded to the IoT device 108 in question, then the first file chunk will be referenced. Likewise, if no file chunks remain, the IoT device in question will be marked to indicate that it has been updated until another update file, if any, becomes available, then the process repeats. As a result, the IoT file share server 302 does not need to maintain multiple copies of the same file for each IoT device 108.

Also shown in the example of FIG. 3, the IoT file share server 302 can provide progress updates 310 to the IoT application server(s) 126 that serve the IoT devices 108 that are involved in a given update process. The progress updates 310 can be periodic, initiated by the IoT file share server 302 without request, or in response to a request (not shown) received from the IoT application server(s) 126. The progress update(s) 310 can identify the IoT device(s) 108 to which an update or one or more file chunks of a file associated with that update has been sent. The progress update(s) 310 can include a percentage complete identifying how much of a given update file has been downloaded to the IoT device(s) 108, although other metrics such as the amount of data downloaded (e.g., bytes) of total update file size, the number of file chunks downloaded of a total number of file chunks for a given file, and/or the like also can be used. The progress updates 310 can additionally include a projected completion time. The projected completion time can include a date by which and/or a time of day by which a given update is projected to be completed. The projected completion time can be calculated based upon a current file chunk out of the total file chunks for a given update file and the awake time the IoT device 108 has shown.

Figure 4:
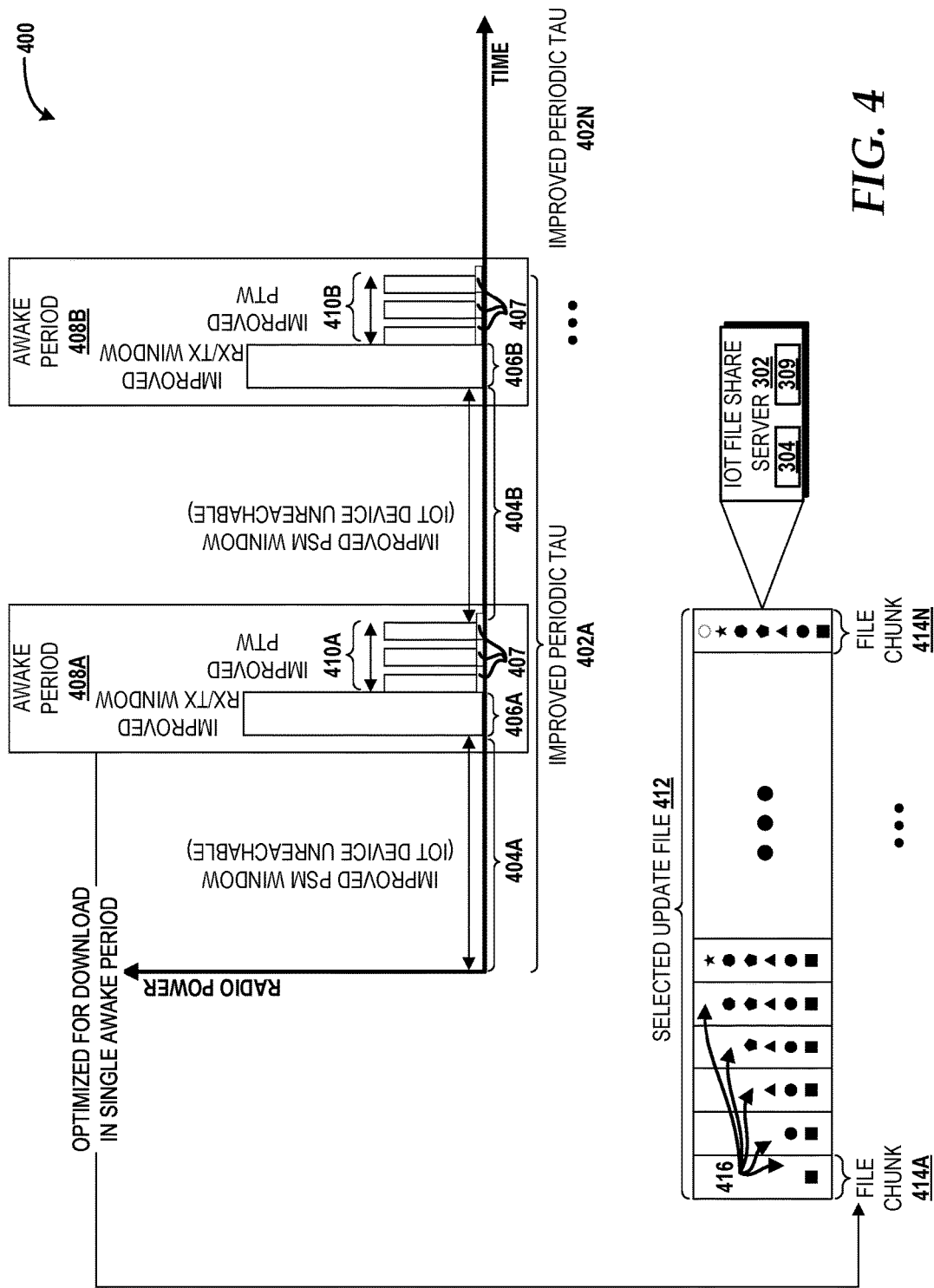
FIG. 4 is a graphical representation of an improved power profile associated with operations of an IoT device during an over-the-air IoT firmware/software update process in accordance with the concepts and technologies disclosed.

Turning now to FIG. 4, a graphical representation of an improved power profile 400 associated with operations of the IoT device 108 during an over-the-air IoT firmware/software update process in accordance with the concepts and technologies disclosed herein will be described. In the example shown, the improved power profile 400 is represented graphically with the X-axis representing time and the Y-axis representing the radio power level of the IoT device 108. The improved power profile 400 enables the concepts and technologies disclosed herein provide an intelligent network-based firmware/software update mechanism for the IoT devices 108. This mechanism allows such updates to be completed successfully in a non-intrusive manner and still deliver the innovative IoT services with long-term battery life (e.g., 10+ years).

The illustrated improved power profile 400 includes improved periodic TAU cycles 402A . . . 402N. During a first improved periodic TAU cycle 402A, the IoT device 108 enters a first improved PSM window 404A during which the IoT device 108 is dormant and unreachable, and the power drawn by the IoT device 108 is extremely low, thereby conserving battery life. The first improved PSM window 404A operates in a manner similar to the PSM window 204A described herein above with reference to FIG. 2. After the first improved PSM window 404A, the IoT device 108 enters a first improved TX window 406A during which the IoT device 108 can transmit data in a manner similar to the first TX window 206A also described herein above with reference to FIG. 2.

The improved power profile 400 also includes awake periods 408A, 408B. A first awake period 408A begins with the first improved TX window 406A and proceeds through a first improved PTW 410A thereby ending the first awake period 408A. The first improved PTW 410A includes a plurality of improved DRX cycles 407 that each include a time period during which the IoT device 108 is reachable (i.e., can be paged) followed by another time period during which the IoT device 108 is unreachable (i.e., cannot be paged). The improved DRX cycles 407 facilitate further battery life savings for the IoT device 108. Although only the improved DRX cycles 407 are shown in the illustrated embodiment, those skilled in the art will appreciate the use of eDRX cycles (not shown) to further enhance batter life saving for the IoT device 108. After the first awake period 408A, the IoT device 108 enter a second improved PSM window 404B during which the IoT device 108 returns to dormancy and is unreachable in a manner similar to that of the first improved PSM window 404A. A second awake period 408B then begins with a second improved TX window 406B and proceeds through a second improved PTW 410B thereby ending the second awake period 408B.

When the IoT device 108 enters the first awake period 408A, the IoT device 108 can generate the awake notification 308 (best shown in FIG. 3) and can send the awake notification 308 towards the IoT file share server 302 (also best shown in FIG. 3). In response to receiving the awake notification 308, the IoT file share server 302 can identify an update file 304 that is to be provided to the IoT device 108. As described above with reference to FIG. 3, the IoT file share server 302 can store a copy of any update files 304 that are to be sent to one or more IoT devices 108. In the illustrated example, the IoT file share server 302 has selected a particular update file ("selected update file") 412 to be provided to the IoT device 108. The illustrated selected update file 412 is partitioned into a plurality of file chunks 414A-414N (hereinafter referred to in the singular as file chunk 414 or in the plural as file chunks 414). Each of the file chunks 414 is optimized for download by the IoT device 108 within in the length of time allotted during a single awake period—such as the first awake period 408A or the second awake period 408B. In this manner, the IoT device 108 can download each of the file chunks 414 within the length of time allotted during a single awake period, and thereby saving battery life over the prior art solutions described herein above (see FIGS. 1 and 2).

The IoT file share server 302 can store references 309 for each of the file chunks 414 so the IoT file share server 302 can know which of the file chunks 414 was the last file chunk downloaded by the IoT device 108. If no file chunks have been downloaded to the IoT device 108, then the IoT file share server 302 can provide the first file chunk of the selected update file 412 to the IoT device 108. Likewise, if no file chunks remain, the IoT device in question will be marked to indicate that it has been updated until another update file, if any, becomes available, then the process repeats. As a result, the IoT file share server 302 does not need to maintain multiple copies of the same file for each IoT device 108. In the illustrated example, the IoT device 108 downloads a first file chunk 414A during the first awake period 408A, a second file chunk 414B in the second awake period 408B, and so on. In addition, each of the file chunks 414 can be associated with a file chunk identifier (generally shown at 416). A file chunk identifier 416 associated with the first file chunk 414A can specify, for example, a total number of file chunks 414 in the selected update file 412 so that the IoT device 108 knows when the last file chunk is received. Alternatively, each file chunk identifier 416 can indicate how many file chunks remain. Other methodologies used by the IoT device 108 to ascertain the status of the download of the selected update file 412 are contemplated. Accordingly, the specific methodologies described herein with regard to the use of the file chunk identifiers 416 should not be construed as being limiting in any way.

Figure 5A:
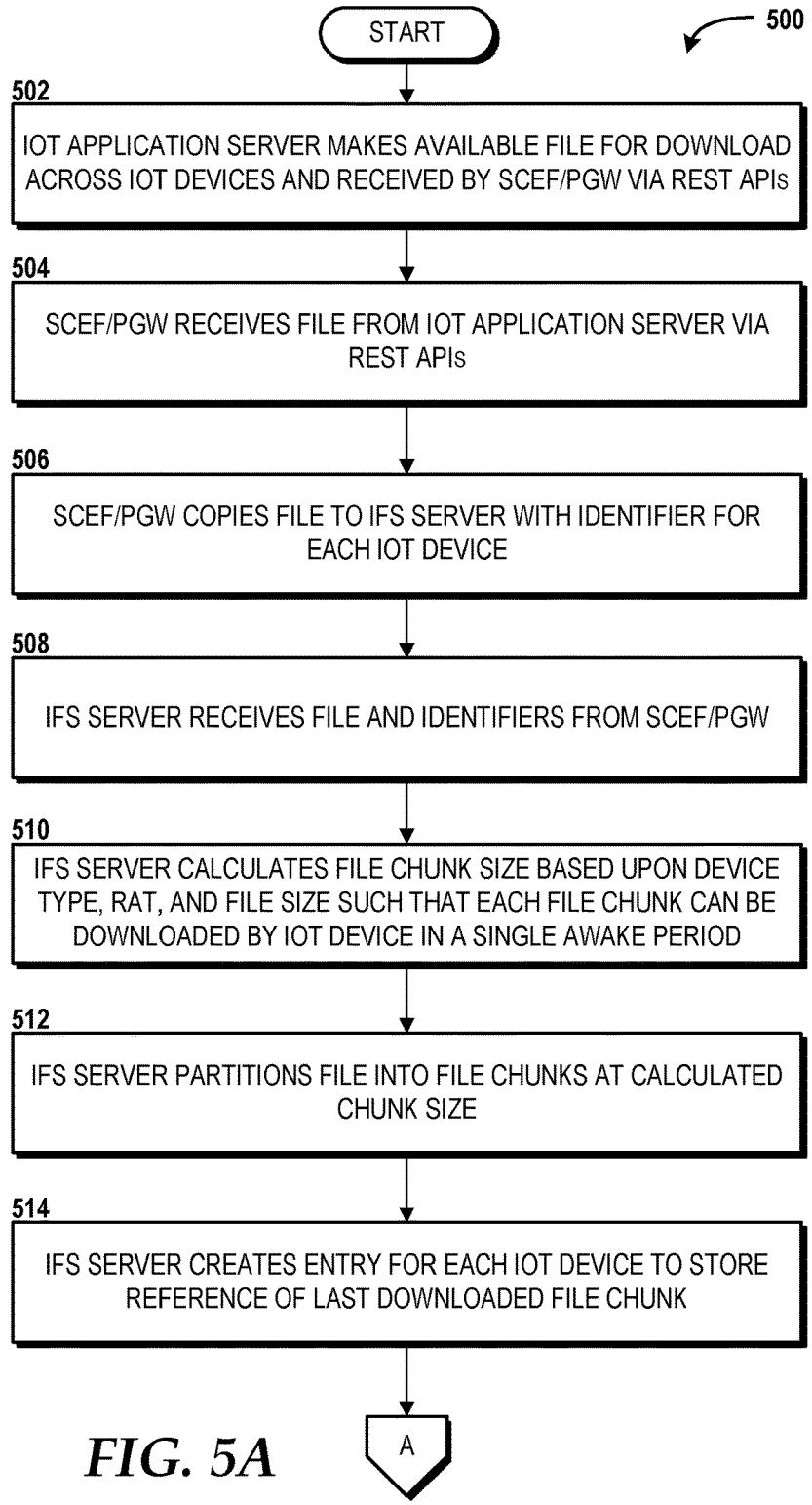
FIGS. 5A and 5B are flow diagrams illustrating a method for providing an enhanced data download mechanism for power-constrained IoT devices.
Figure 5B:
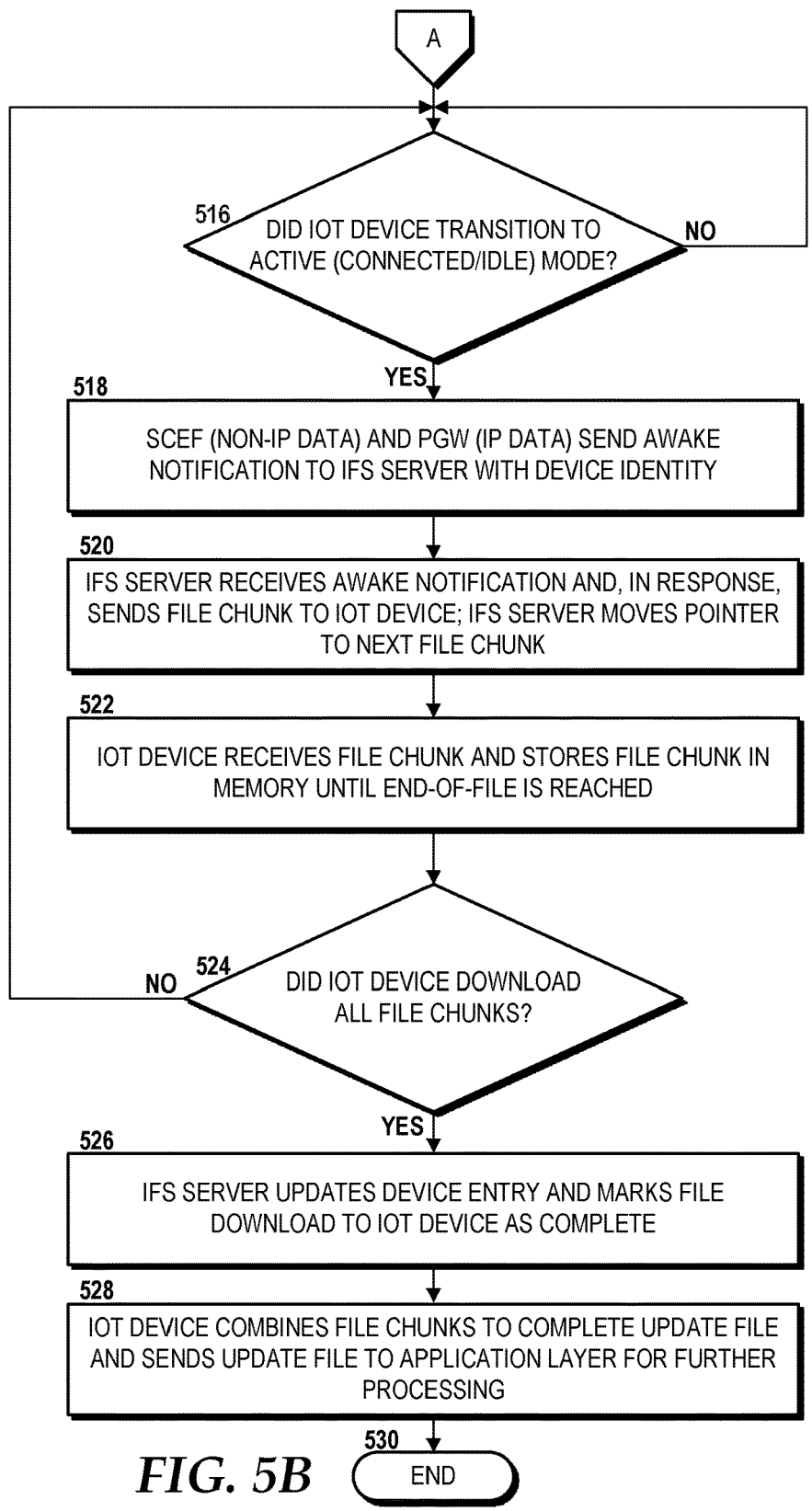

Turning now to FIGS. 5A and 5B, aspects of a method 500 for providing an enhanced data download mechanism for power-constrained IoT devices, such as the IoT devices 108, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, operations of the method 500 are described as being performed, at least in part, by the IoT device 108, the S/PGW 118, the SCEF 120, the IoT application server 126, and/or the IoT file share server 302 via execution, by one or more processors, of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will be described with reference to FIGS. 5A and 5B with further reference to FIGS. 3 and 4. The method 500 begins and proceeds to operation 502, where one or more of the IoT application servers 126 makes available one or more of the update files 304 for download across one or more of the IoT devices 108 to update the IoT device(s) 108. From operation 502, the method 500 proceeds to operation 504, where the S/PGW 118 and/or the SCEF 120 receives the update file(s) 304 from the IoT application server(s) 126. From operation 504, the method 500 proceeds to operation 506, where the S/PGW 118 and/or the SCEF 120 copies the update files 304 to the IoT file share server 302 along with information identifying each of the IoT devices 108. This information can include an identity (also referred to herein as device identification). The identity can include device identification information such as, for example, an IMSI, an MSISDN, an IMEI, or a combination of an IMSI and an IMEI. The device identification information, in some embodiments, can additionally include a device category that specifies a category to which the device belongs. From operation 506, the method 500 proceeds to operation 508, where the IoT file share server 302 receives the update files 304 and the device identification information from the S/PGW 118 and/or the SCEF 120.

From operation 508, the method 500 proceeds to operation 510, where the IoT file share server 302 calculates received a file chunk size based upon a device type and a file size such that each file chunk can be downloaded in a single awake period. Turning back to FIG. 4, for example, the IoT file share server 302 can calculate a file chunk size for the file chunks 414 of the selected update file 412 to be provided to the IoT device 108 such that each of the file chunks 414 can be downloaded to the IoT device 108 in the length of time allotted by the awake period 408. In some embodiments, the size of each file chunk is dependent upon the bandwidth available to the target IoT device based upon the device category of that device as identified via the device identification. Accordingly, there can be different sizes of file chunks for the same file.

From operation 510, the method 500 proceeds to operation 512, where the IoT file share server 302 partitions the update files 304 into file chunks at the calculated file chunk size. From operation 512, the method 500 proceeds to operation 514, where the IoT file share server 302 creates an entry for each IoT device 108. The entry can store a reference 309 to the last downloaded file chunk in a given update session.

From operation 514, the method 500 proceeds to operation 516 (shown in FIG. 5B), where the S/PGW 118 and/or the SCEF 120 determines whether the IoT device 108 has transitioned to an awake period 408. In response to determining that the IoT device 108 has not transitioned to an awake period 408, the method 500 returns to operation 516 and this operation repeats. Alternatively, in response to determining that the IoT device 108 has transitioned to an awake period 408, the method 500 proceeds to operation 518, where the SCEF 120 (for non-IP data) and the S/PGW 118 (for IP data) generates an awake notification 308 and sends the awake notification 308 to the IoT file share server 302 (as best shown in FIG. 3). The awake notification 308 includes the device identifier of the IoT device 108.

From operation 518, the method 500 proceeds to operation 520, where the IoT file share server 302, in response to receiving the awake notification 308, determines the file chunk 414 to send to the IoT device 108 and sends that file chunk 414 to the IoT device 108. In addition, the IoT file share server 302 moves a pointer to the reference 309 associated with the next file chunk. From operation 520, the method 500 proceeds to operation 522, where the IoT device 108 receives the file chunk 414 and stores the file chunk 414 in memory (best shown in FIG. 6) until the end of the selected update file 412 has been reached. As explained above, each of the file chunks 414 can be associated with a file chunk identifier 416. The file chunk identifier 416 associated with a first file chunk 414A received by the IoT device 108 can specify, for example, a total number of file chunks 414 in the selected update file 412 so that the IoT device 108 knows when the last file chunk is received. Alternatively, each file chunk identifier 416 can indicate how many file chunks remain. Other methodologies used by the IoT device 108 to ascertain the status of the download of the selected update file 412 are contemplated. Accordingly, the specific methodologies described herein with regard to the use of the file chunk identifiers 416 should not be construed as being limiting in any way.

From operation 522, the method 500 proceeds to operation 524, where the IoT file share server 302 determines whether all file chunks 414 of the selected update file 412 have been downloaded by the IoT device 108. If not, the method 500 returns to operation 516, and the method 500 continues as described above. If, however, the IoT file share server 302 determines that all file chunks 414 of the selected update file 412 have been downloaded, the method 500 proceeds to operation 526, where the IoT file share server 302 updates a device entry associated with the IoT device 108 and marks download of the selected update file 412 as complete.

From operation 526, the method 500 proceeds to operation 528, where the IoT device 108 combines the file chunks 414 received from the IoT file share server 302 to complete the selected update file 412 and sends the selected update file 412 to the application layer for further processing by the IoT device 108. For example, the IoT device 108 can install the selected update file 412. From operation 528, the method 500 proceeds to operation 530, where the method 500 ends.

Figure 6:
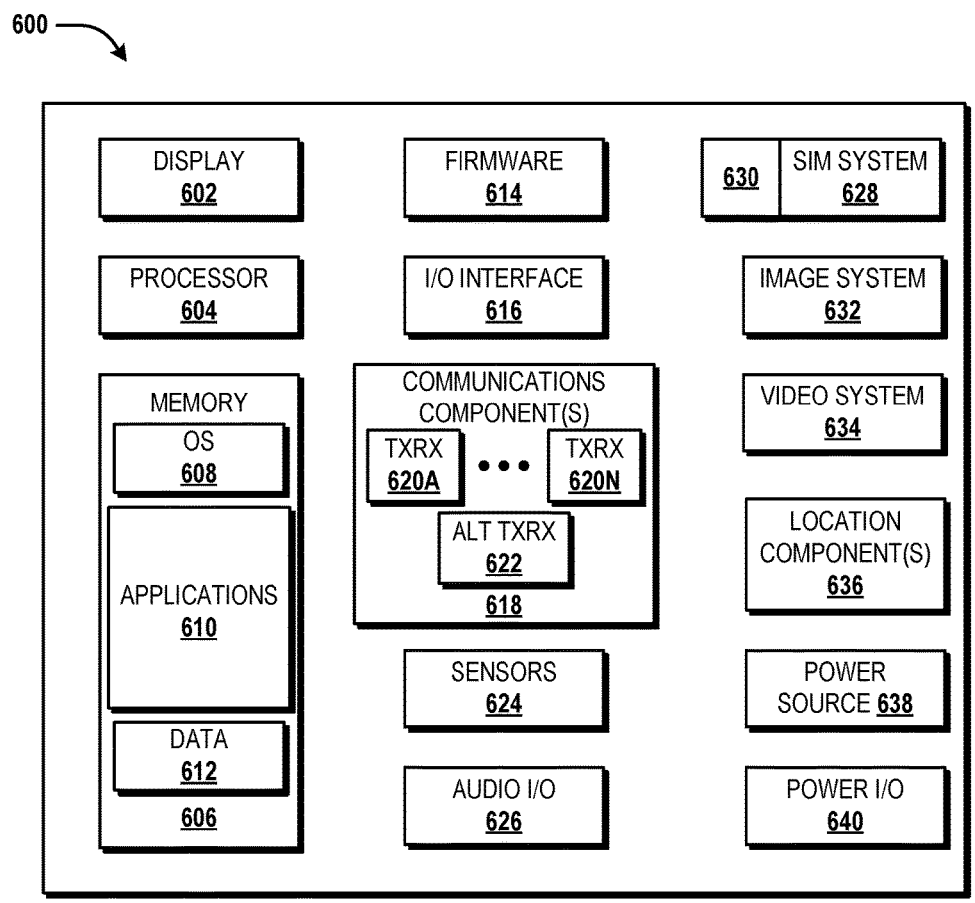
FIG. 6 is a block diagram illustrating an example mobile device capable of implementing aspects of the embodiments disclosed herein.

Turning now to FIG. 6, an illustrative mobile device 600 and components thereof will be described. In some embodiments, one or more of the UEs 102 (shown in FIG. 1) can be configured like the mobile device 600. In some embodiments, one or more of the IoT devices 108 (also shown in FIG. 1) can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UP") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, one or more identifiers, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
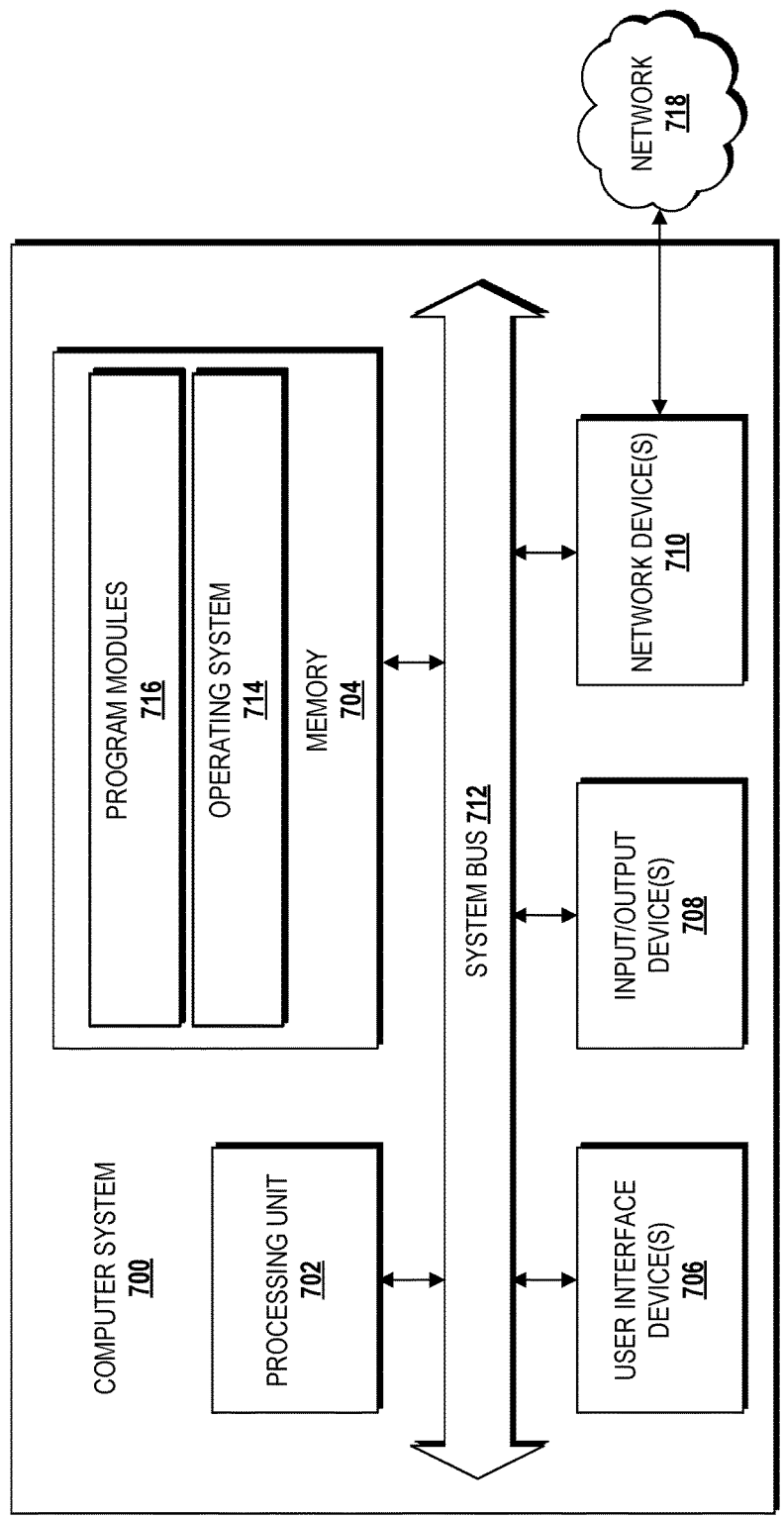
FIG. 7 is a block diagram illustrating an example computer system capable of implementing aspects of the embodiments presented herein.

Turning now to FIG. 7 is a block diagram illustrating a computer system 700 configured to provide the functionality in accordance with various embodiments of the concepts and technologies disclosed herein. The systems, devices, and other components disclosed herein can utilize, at least in part, an architecture that is the same as or at least similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718, such as the network(s) 112. Examples of the network devices 710 include, but are not limited to, a modem, a radio frequency ("RF") or infrared ("IR") transceiver, a telephonic interface, a bridge, a router, or a network card. The network 718 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN").

Figure 8:
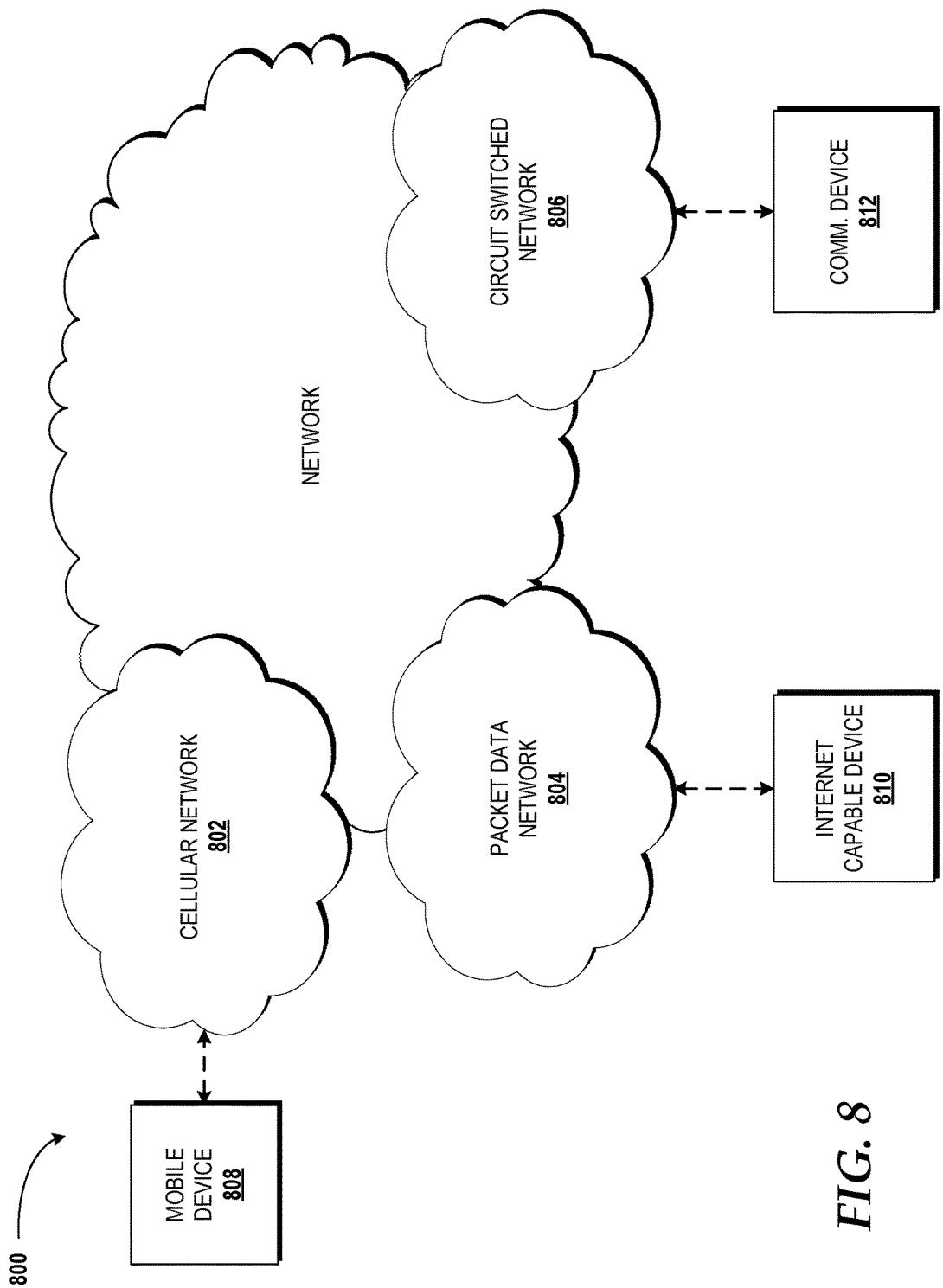
FIG. 8 is a block diagram illustrating an example network capable of implementing aspects of the embodiments presented herein.

Turning now to FIG. 8, details of a network 800 are illustrated, according to an illustrative embodiment. In some embodiments, the network 800 includes the network(s) 122. The network 800 includes a cellular network 802, a packet data network 804, for example, the Internet, and a circuit switched network 806, for example, a PSTN. The cellular network 802 includes various components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the UE device(s) 102, the IoT devices 108, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a POTS. The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network is used to refer broadly to any combination of the networks 802, 804, 806 shown in FIG. 8 and/or the network 112 shown in FIGS. 1 and 3. It should be appreciated that substantially all of the functionality described with reference to the network(s) 122 can be performed by the cellular network 802, the packet data network 804, and/or the circuit switched network 806, alone or in combination with other networks, network elements, and the like.

Figure 9:
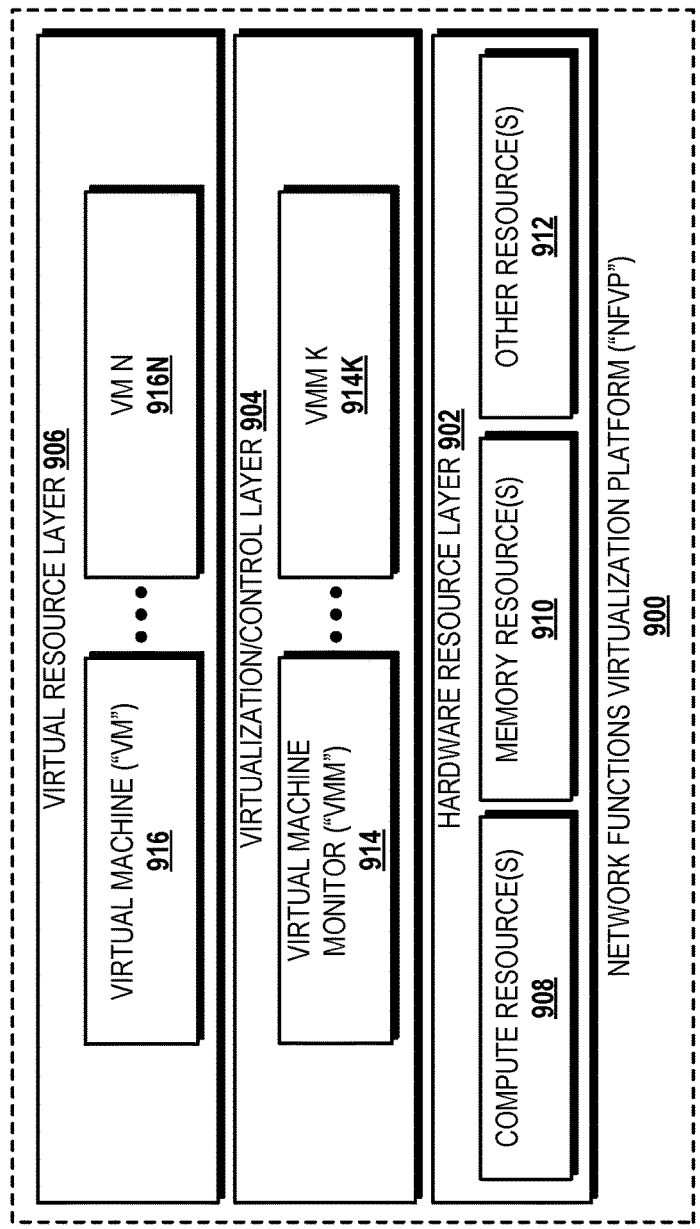
FIG. 9 is a block diagram illustrating an example network functions virtualization platform ("NFVP") capable of implementing aspects of the embodiments presented herein.

Turning now to FIG. 9, a network functions virtualization platform ("NFVP") 900 will be described, according to an exemplary embodiment. The architecture of the NFVP 900 can be used to implement VNFs of the PNFs disclosed herein. For example, the NFVP 900 can be utilized to implement the MME 114, the HSS 116, the S/PGW 118, the SCEF 120, other PNFs, or some combination thereof.

The NFVP 900 is a shared infrastructure that can support multiple services and network applications. The illustrated NFVP 900 includes a hardware resource layer 902, a virtualization/control layer 904, and a virtual resource layer 906 that work together to perform operations as will be described in detail herein.

The hardware resource layer 902 provides hardware resources, which, in the illustrated embodiment, include one or more compute resources 908, one or more memory resources 910, and one or more other resources 912. The compute resource(s) 908 can include one or more hardware components that perform computations to process data, and/or to execute computer-executable instructions of one or more application programs, operating systems, and/or other software. The compute resources 908 can include one or more central processing units ("CPUs") configured with one or more processing cores. The compute resources 908 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 908 can include one or more discrete GPUs. In some other embodiments, the compute resources 908 can include CPU and GPU components that are configured in accordance with a co-processing CPU/GPU computing model, wherein the sequential part of an application executes on the CPU and the computationally-intensive part is accelerated by the GPU. The compute resources 908 can include one or more system-on-chip ("SoC") components along with one or more other components, including, for example, one or more of the memory resources 910, and/or one or more of the other resources 912. In some embodiments, the compute resources 908 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 908 can be or can include one or more hardware components architected in accordance with an ARM architecture, available for license from ARM HOLDINGS of Cambridge, United Kingdom. Alternatively, the compute resources 908 can be or can include one or more hardware components architected in accordance with an x86 architecture, such an architecture available from INTEL CORPORATION of Mountain View, Calif., and others. Those skilled in the art will appreciate the implementation of the compute resources 908 can utilize various computation architectures, and as such, the compute resources 908 should not be construed as being limited to any particular computation architecture or combination of computation architectures, including those explicitly disclosed herein.

The memory resource(s) 910 can include one or more hardware components that perform storage operations, including temporary or permanent storage operations. In some embodiments, the memory resource(s) 910 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 908.

The other resource(s) 912 can include any other hardware resources that can be utilized by the compute resources(s) 908 and/or the memory resource(s) 910 to perform operations described herein. The other resource(s) 912 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 902 can be virtualized by one or more virtual machine monitors ("VMMs") 914-914K (also known as "hypervisors;" hereinafter "VMMs 914") operating within the virtualization/control layer 904 to manage one or more virtual resources that reside in the virtual resource layer 906. The VMMs 914 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916-916N (hereinafter "VMs 916"). Each of the VMs 916 can execute one or more applications.

Based on the foregoing, it should be appreciated that concepts and technologies directed to an enhanced data download mechanism for power constrained IoT devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. An Internet of Things (IoT) device comprising:
   a processor; and
   memory that stores instructions that, when executed by the processor, cause the processor to perform operations comprising
   receiving, from an IoT file share server, a plurality of file chunks, wherein each file chunk of the plurality of file chunks is received in a single awake period of the IoT device, wherein each file chunk of the plurality of file chunks has a file chunk size that was calculated by the IoT file share server based, at least in part, upon a device type of the IoT device and a file size of an update file from which the plurality of file chunks are partitioned, and wherein the update file comprises an update for the IoT device,
   combining the plurality of file chunks to complete the update file, and
   sending the update file to an application layer of the IoT device for further processing.

2. The IoT device of claim 1, wherein the operations further comprise, in response to receiving each file chunk of the plurality of file chunks, storing each file chunk of the plurality of file chunks in the memory.

3. The IoT device of claim 2, wherein each file chunk of the plurality of file chunks is associated with a file chunk identifier that identifies a particular file chunk of the plurality of file chunks so that the IoT device can determine when all of the plurality of file chunks have been downloaded.

4. The IoT device of claim 2, wherein a first file chunk of the plurality of file chunks is associated with a file chunk identifier that identifies a total number of file chunks in the update file, and the IoT device determines when all of the plurality of file chunks have been downloaded based upon when the total number of file chunks has been downloaded.

5. The IoT device of claim 2, wherein each file chunk of the plurality of file chunks is associated with a file chunk identifier that indicates how many file chunks remain.

6. The IoT device of claim 1, wherein receiving, from the IoT file share server, the plurality of file chunks comprises receiving, from the IoT file share server, each file chunk of the plurality of file chunks in response to the IoT device transitioning to an awake period.

7. The IoT device of claim 1, wherein the update file comprises a software update for software to be executed by the processor.

8. The IoT device of claim 1, wherein the update file comprises a firmware update for firmware of the IoT device.

9. The IoT device of claim 1, wherein sending the update file to the application layer of the IoT device for further processing comprises sending the update file to the application layer of the IoT device for installation of the update file.

10. An Internet of Things (IoT) file share server comprising:
    a processor; and
    memory that stores instructions that, when executed by the processor, cause the processor to perform operations comprising
    receiving an update file from an IoT application server, wherein the update file comprises an update for an IoT device,
    calculating a file chunk size based, at least in part, upon a device type of the IoT device and a file size of the update file such that each file chunk of a plurality of file chunks is downloadable to the IoT device in a single awake period of the IoT device, and
    partitioning the update file into the plurality of file chunks, wherein each file chunk of the plurality of file chunks comprises a portion of the update file, and wherein the portion is of the file chunk size.

11. The IoT file share server of claim 10, wherein the operations further comprise:
   determining whether the IoT device transitioned to an awake period; and
   when the IoT device has transitioned to the awake period, receiving an awake notification comprising a device identity that uniquely identifies the IoT device.

12. The IoT file share server of claim 11, wherein the operations further comprise receiving the device identity along with the update file.

13. The IoT file share server of claim 11, wherein the awake notification originates from a service capability exposure function or from a packet gateway node.

14. The IoT file share server of claim 11, wherein the operations further comprise:
   sending a file chunk of the plurality of file chunks to the IoT device; and
   moving a pointer to a next file chunk of the plurality of file chunks.

15. The IoT file share server of claim 14, wherein the operations further comprise:
   determining whether the IoT device has downloaded the plurality of file chunks; and
   when the IoT device has downloaded the plurality of file chunks, designating the update file for the IoT device as downloaded.

16. A computer storage medium comprising computer-executable instructions that, when executed by a processor, cause the processor to perform operations comprising:
   receiving an update file from an Internet of Things (IoT) application server, wherein the update file comprises an update for an IoT device;
   calculating a file chunk size based upon a device type of the IoT device and a file size of the update file such that each file chunk of a plurality of file chunks is downloadable to the IoT device in a single awake period of the IoT device; and
   partitioning the update file into the plurality of file chunks, wherein each file chunk of the plurality of file chunks comprises a portion of the update file, and wherein the portion is of the file chunk size.

17. The computer storage medium of claim 16, wherein the operations further comprise:
   determining whether the IoT device transitioned to an awake period; and
   when the IoT device has transitioned to the awake period, receiving an awake notification comprising a device identity that uniquely identifies the IoT device.

18. The computer storage medium of claim 17, wherein the operations further comprise receiving the device identity along with the update file.

19. The computer storage medium of claim 17, wherein the awake notification originates from a service capability exposure function or from a packet gateway node.

20. The computer storage medium of claim 17, wherein the operations further comprise:
   sending a file chunk of the plurality of file chunks to the IoT device;
   moving a pointer to a next file chunk of the plurality of file chunks;
   determining whether the IoT device has downloaded the plurality of file chunks; and
   when the IoT device has downloaded the plurality of file chunks, designating the update file for the IoT device as downloaded.

* * * * *